(12) United States Patent
Cornet et al.

(10) Patent No.: US 7,599,315 B2
(45) Date of Patent: Oct. 6, 2009

(54) TOPOLOGY DISCOVERY IN A DUAL RING NETWORK

(75) Inventors: Jerome Cornet, Ottawa (CA); Gerard Damm, Ottawa (CA); Milan Zoranovic, Kanata (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 985 days.

(21) Appl. No.: 10/319,675

(22) Filed: Dec. 16, 2002

(65) Prior Publication Data

US 2004/0114530 A1    Jun. 17, 2004

(51) Int. Cl.
*H04L 12/28* (2006.01)
(52) U.S. Cl. ........................ 370/258; 709/224
(58) Field of Classification Search ................ 370/222, 370/252, 258
See application file for complete search history.

(56) References Cited

U.S. PATENT DOCUMENTS

| | | | | |
|---|---|---|---|---|
| 5,590,124 | A | 12/1996 | Robins | 370/258 |
| 6,269,452 | B1* | 7/2001 | Daruwalla et al. | 714/4 |
| 6,430,700 | B1* | 8/2002 | Daruwalla et al. | 714/4 |
| 6,615,362 | B1* | 9/2003 | Daruwalla et al. | 714/4 |
| 6,785,224 | B2* | 8/2004 | Uematsu et al. | 370/222 |
| 6,928,050 | B2* | 8/2005 | Lynch et al. | 370/224 |
| 6,952,396 | B1* | 10/2005 | Cottreau et al. | 370/222 |
| 6,952,397 | B2* | 10/2005 | Mor et al. | 370/223 |
| 6,963,537 | B2* | 11/2005 | Mor et al. | 370/232 |
| 7,181,436 | B1* | 2/2007 | Conley et al. | 707/1 |
| 7,269,177 | B2* | 9/2007 | Baker | 370/403 |
| 7,339,887 | B2* | 3/2008 | Griswold et al. | 370/216 |
| 2004/0213274 | A1* | 10/2004 | Fan et al. | 370/401 |

OTHER PUBLICATIONS

IEEE 802.17 RPR Working Group, "Draft Standard for Resilient Packet Ring Access Method . . . ", Oct. 9, 2001, IEEE Standards Department, Draft 0.1 P802.17, Retrieved from "http://www.ieee802.org/17/documents/presentations/sep2001/nu_draft_01.pdf", posted on Nov. 5, 2001.*
DeJaegher et al, "Topology Discovery Proposal to IEEE 802.17", Sep. 10, 2001, IEEE Standards Department, Version 0.8, Retrieved from "http://www.ieee802.org/17/documents/presentations/sep2001/jcf_topodraft_02.pdf", posted on Nov. 5, 2001.*
Andrew S. Tanenbaum, "ComputerNetworks",Computer Networks. Third Edition, London: Prentice-Hall International, GB, 1996, pp. 355-359, XP002360242.
"Part 17: Resilient packet ring access method and physical layer Specifications(IEEE 802.17/d1.0 DARWIN)", draft document ieee 802.17, [Online], Jan. 29, 2002, pp. 83-104, XP002359984 Retrieved from the Internet: URL:http://222.ieee802.org/17/documents/drafts/Darwin_v1_0.pdf< [retrieved on Dec. 17, 2005].

* cited by examiner

*Primary Examiner*—Hassan Kizou
*Assistant Examiner*—Brian O Connor

(57) ABSTRACT

The resilient packet ring (RPR for short) is receiving much attention as a telecommunications network architecture. The RPR consists of dual counter-rotating ringlets and implements a ring protection scheme such as ring wrap and source steering. Topology discovery is an important aspect of the network management of the RPR. Herein described is a new topology discovery algorithm which performs in multiple phases. According to one phase of the algorithm, a station on the ring periodically exchange with only its neighboring stations a control messages containing a topology database. The topology database indicates addresses of stations on the ring and their link status. The algorithm should find applications not only in RPR but also other ring architectures.

24 Claims, 8 Drawing Sheets

*Figure 4*  Topology Discovery Phase

Steady State Phase

TOPOLOGY DISCOVERY IN A DUAL RING NETWORK

FIELD OF THE INVENTION

The invention resides in the field of management of telecommunications networks which comprise at least a pair of counter-rotating rings. In particular, it relates to techniques of topology discovery in the dual ring network, which are fast and resilient in operation.

BACKGROUND OF THE INVENTION

A variety of network architectures are available for designing and implementing a telecommunications network. The ring topology is found very frequently in network architectures. There are a number of topology discovery algorithms and commercial solutions for general logical topologies. Some examples are spanning tree algorithms for Ethernet and shortest path algorithms for general graph theory. There is, however, less focus on the specific ring architecture and the physical ring topology. The dual ring topology offers numerous advantages over a single ring topology, such as reliability and bandwidth flexibility to name a few. A telecommunications network in the dual ring topology uses two physically separated rings (also called ringlets), one for each traffic direction, clockwise (CW) and counter-clockwise (CCW), as shown in FIG. 1. In the figure, five stations (also called nodes), A1 to A5, are connected in a dual ring which comprises CW (clockwise) ring 10 and CCW (counter clockwise) ring 12.

The bi-directional ring allows for two protection mechanisms to be implemented in case of media failure, such as link failure, or station failure, one being the ring wrap in FDDI (fiber distributed data interface) or SONET/SDH BLSR (Bi-directional Line Switched Ring) and another being the source steering in SONET UPSR (Unidirectional Path Switched Ring) where the source station selects which ringlet will carry the packet. The ring wrap basically consists in making a U-turn when a link failure is encountered. FIG. 2 shows an example of wrapping: when a failure 20 on a link is detected, station A2 wraps all the traffic which is to go on the failed link back onto the other link as depicted by numeral 22. In the source steering, all the stations are made aware of a failure on one ring and any affected traffic is steered to the remaining ring at the source station.

In the management of a ring network, problems consist in making sure that every station in the ring is aware of the current ring topology (locations and identifications of all other stations, link status between stations, current station or link failures, recovery of failures, etc.). At initialisation of the network, there is a discovery phase where all the stations fill their empty database. Then, there are database updates due to a new station insertion or an existing station removal, or due to a link or station failure. The database of each station needs to be adjusted accordingly. All the local databases must be synchronized as quickly as possible. Also, it is best to have a simple and non-centralized solution. The associated control information should be resilient itself to failures and should minimize usage of the bandwidth as well as the time needed to propagate the information.

U.S. Pat. No. 5,590,124 Dec. 31, 1996 Robins describes a protocol for a ring interconnect architecture which defines data exchange operations (e.g., GET and PUT operations) between components associated with different stations on the ring. The patent also describes a topology discovery protocol which uses data exchange operations for such a purpose. This protocol allows an instigator station to use the data transfer protocol to determine the topology of the ring architecture to which it is coupled. The protocol is not believed to be able to operate when one or more connections have failed in the ring. The patent is totally silent about such eventuality.

A new IEEE protocol is in the process of being standardized (802.17) for a flexible and resilient dual ring topology which is called Resilient Packet Ring (RPR for short) and is a MAC layer protocol dedicated to ring architectures, especially for underlying Metro optical networks. The protocol also features a ring discovery method which requires that the system should be entirely plug-and-play. This means that the stations on the ring have to discover by themselves what other stations are on the ring, and at what distance.

Early 2002, there were two drafts for the RPR standard (named Darwin and Alladin). Both drafts for RPR contain discovery algorithms. Darwin relies on broadcasting expanding control messages; that is to say, each station either originates a message or appends its own description to each message it receives from others. At the end of its life, each message has expanded up to contain the description of all the stations in the ring. Updates are activated upon certain events (station/link status change, validation failure, timer expiration, etc.).

Alladin is based on two different kinds of messages (Hello and Status) and a database version number of each station. Hello messages are used by a station to transmit its database version number to its neighbors only. Status messages are broadcast by a station to update its status and version numbers of all other stations on the ring, whenever there is a change of its status or a failure of connecting links.

An IEEE draft (802.17/D1.0) for RPR was published in August 2002 and it contains a topology discovery protocol. According to the protocol, at bring up, at any point that a station detects a change in local status, at any point that a station detects a new station on the ring, upon a change in protection status, and periodically a station broadcasts a topology message to all stations on the ring. The message contains all the information about the local station and when a station receives the message it updates its local topology image.

Applicant's earlier filed application entitled "Topology Management Of Dual Ring Network", filed Nov. 26, 2002, in the United States Patent Office, describes another topology discovery algorithm. The algorithm uses only one discovery packet format and a set of timer settings, which controls a variety of actions at a station on the ring. Under the control of a variety of timer settings, a station periodically broadcasts discovery packets to all the stations on the ring so that database at each station can be continually up to date and constantly monitors the neighboring stations operation by sending a discovery packet to them. The discovery packets contain the description of only one station and two links to neighboring stations. This algorithm therefore relies on sending continuously a small flow of information. It has the advantage of being resilient, simple and of not using too much bandwidth, which makes its propagation faster. The algorithm should still be operational in case there are several link failures in the ring and the wrapping is not implemented.

The IEEE draft (802.17/D1.0) mentioned above contains some requirements with regards to the topology discovery mechanism. They are that the method should converge in about a round trip time (RTT) in normal operation, RTT being the time it takes for a packet to traverse all the stations around the ring, and that it has to discover the topology in special situations (one of the rings or the two being cut, a station being isolated, etc.).

The above solutions (Darwin and Alladin) do not cope well with misbehaving topologies, in which one or more stations are isolated. The above mentioned Applicant's earlier filed application describes an algorithm which addresses this problem.

Also, most algorithms, including those discussed above take a round trip time to converge in normal operation, whereas the algorithm according to this invention takes only about half of the RTT, by using the two directions of the ring in an interdependent fashion. In the present invention, messages are exchanged between two neighboring stations, that is to say, messages are terminated and originated and are never forwarded. Therefore, there is no broadcast storm. The invention is easier to detect failure and it has a fewer messages to process.

While the invention is described specifically in reference to RPR, it should be noted that it could be used in any kind of ring-oriented architecture as long as it features at least two counter-rotating rings.

SUMMARY OF THE INVENTION

In accordance with a broad aspect of the invention, the network management algorithm uses a few of control messages which are exchanged only between two neighboring stations. The control message contains a topology database which indicates addresses of the stations on the ring and their link status.

In accordance with a further aspect, the algorithm is directed to ring topology discovery wherein each station on the ring exchanges a discovery message with its neighboring stations in both directions and keeps updating its topology database using those received from its neighboring stations. When the same station address appears in the updated topology database, a ring is complete.

Briefly stated, the invention resides in a resilient packet ring network having a plurality of stations linked through a pair of counter rotating ringlets and is directed to a method of communicating network information among the stations. The method comprises steps of (a) exchanging, through the ringlets, discovery messages with respective neighboring stations, the discovery messages containing topology databases stored in the stations and (b) updating the topology databases. The method further includes steps of (c) exchanging, through the ringlets, discovery messages with the respective neighboring stations, the discovery messages containing updated topology databases stored in the stations, and (d) repeating the above steps to complete a topology image of the network.

In accordance with another aspect the invention is directed to a station in a resilient packet ring network which comprises an inner ringlet transporting traffic in one direction and an outer ringlet transporting traffic in the opposite direction. The station comprises a link to each of two neighboring stations, the link comprising the inner and the outer ringlets, an inner interface for transmitting traffic to and receiving traffic from the inner ringlet and an outer interface for transmitting traffic to and receiving traffic from the outer ringlet. The station further comprises a station address which identifies collectively the inner and outer interfaces, a database memory for storing a topology database which represents link status and addresses of operative stations on the network, and a controller for regulating the transmission of a variety of control messages onto the inner and outer ringlets.

DETAILED DESCRIPTION OF EMBODIMENTS OF INVENTION

Figure 3:
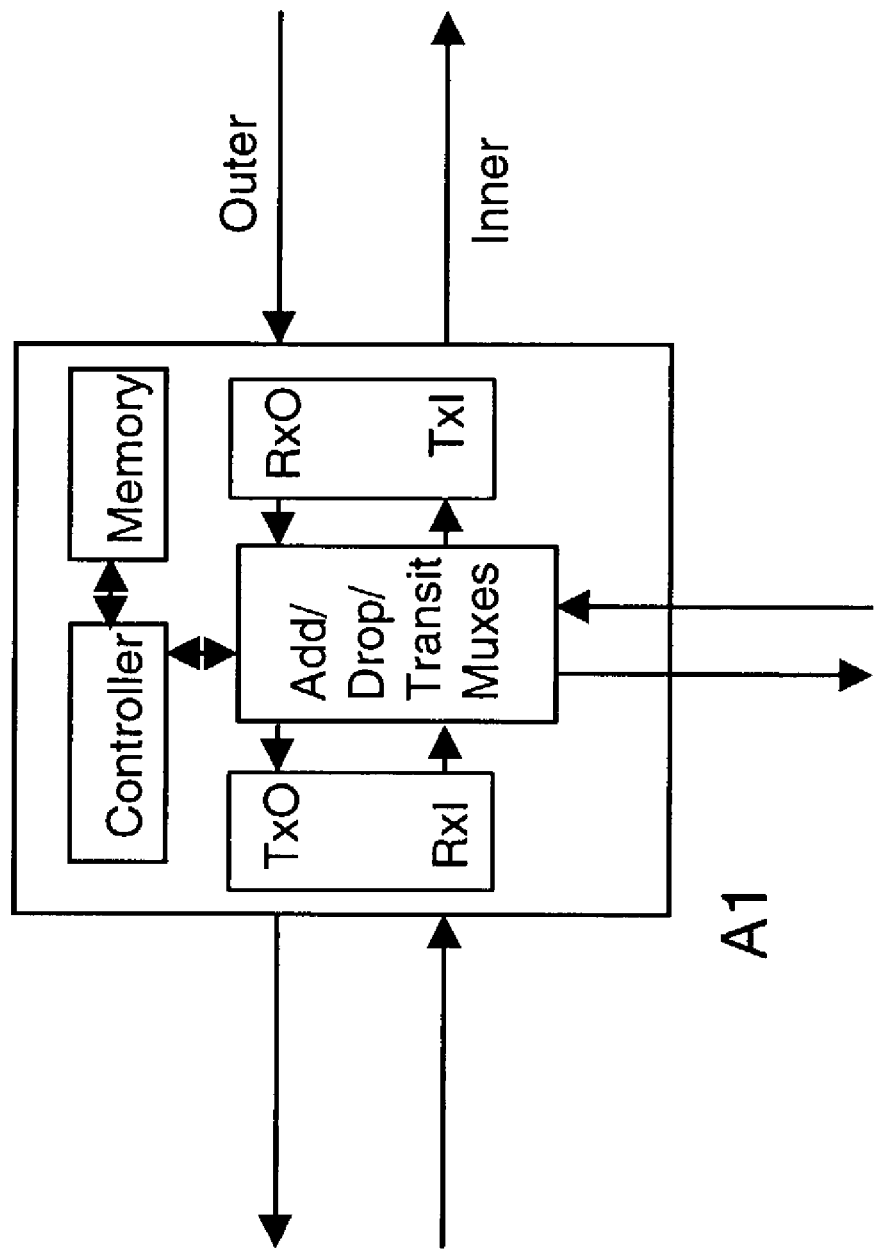
FIG. 3 illustrates an embodiment of the invention in which each station has two unique MAC addresses, and four interfaces: TxI, TxO, RxI, RxO.

FIG. 3 illustrates an embodiment of the invention. In FIG. 3, each station has a unique address (that will be called MAC address) and two bidirectional interfaces to the rings: TxI, TxO, RxI, RxO, transmit (Tx) and receive (Rx) on the inner and outer ring respectively. It also has another bidirectional interface to add or remove traffic from the ring. There are a controller and a memory, the controller for controlling a variety of operations of the interfaces and add/drop/transit multiplexers and the memory for storing topology database.

In accordance with one embodiment of the invention, the algorithm works in multiple phases as will be described below:
(1) Topology Discovery Phase:
  The station does not know the topology of the ring and tries to discover it. When the ring topology is discovered, it proceeds to steady state phase.
(2) Steady State Phase:
  The station knows the topology of the ring and exchanges periodically some information with its neighbors. When a failure may be discovered, it proceeds to failure/recovery phase.
(3) Failure/Recovery Phase:
  The station discovers a failure on any of its interfaces and may initiate topology discovery phase. The equipment can also enter this phase when it encounters a change in the local status of the node.

The method uses messages sent between stations, the messages containing a topology database. The topology database contains a list of addresses separated by a link state information. For the sake of clarity, the addresses will be written as Ax (where x is the station number) and the link status (between 2 stations) will be written as:
  _: there is connection by the inner ring,
  –: there is a connection by the outer ring,
  =: there is a bidirectional connection (both inner and outer),
  X: there is a failure in one of the ringlets,
  ?: the state of the links (both inner and outer) is unknown.

The topology database will be sent with the stations ordered in the inner ring direction. For example:
  ?$A_x$? means (link status unknown on both sides of station $A_x$),
  ?$A_x\_A_{x+1}$-$A_{x+2}$? means (there is an inner connection between stations $A_x$ and $A_{x+1}$, there is an outer connection between stations $A_{x+1}$ and $A_{x+2}$, link status on the remaining sides of stations $A_x$ and $A_{x+2}$ are unknown),
  ?$A_{x-2}\_A_{x-1}$=$A_x$=$A_{x+1}$-$A_{x+2}$? means (there are bidirectional connections between stations $A_{x-1}$ and $A_x$, and stations $A_x$ and $A_{x+1}$, there is an inner connection between stations $A_{x-2}$ and $A_{x-1}$, there is an outer connection between stations $A_{x+1}$ and $A_{x+2}$, link status on the remaining sides of stations $A_{x-2}$ and $A_{x+2}$ are unknown),
  XA1=A2=A3=A4=A5X means (there are bidirectional connections between stations A1 and A2, stations A2 and A3, stations A3 and A4, and stations A4 and A5, there is a failure in one of ringlets on a link on the remaining side of stations A1 and A5.

There are four types of messages (identified by a control word) which are:
topology discovery message (DISC_MSG),
steady-state database exchange message (STDY_MSG),
failure message (FAIL_MSG),
recovery message (RECO_MSG).

There are also four timers that will be used in the different phases and that are configurable by the operator or the management system:

Td is the timer used during the discovery phase
Ts is the timer used during steady state
Tf is the timer used to detect a failure in the steady state
Tc is the timer used in the failure recovery phase.

Figure 4:
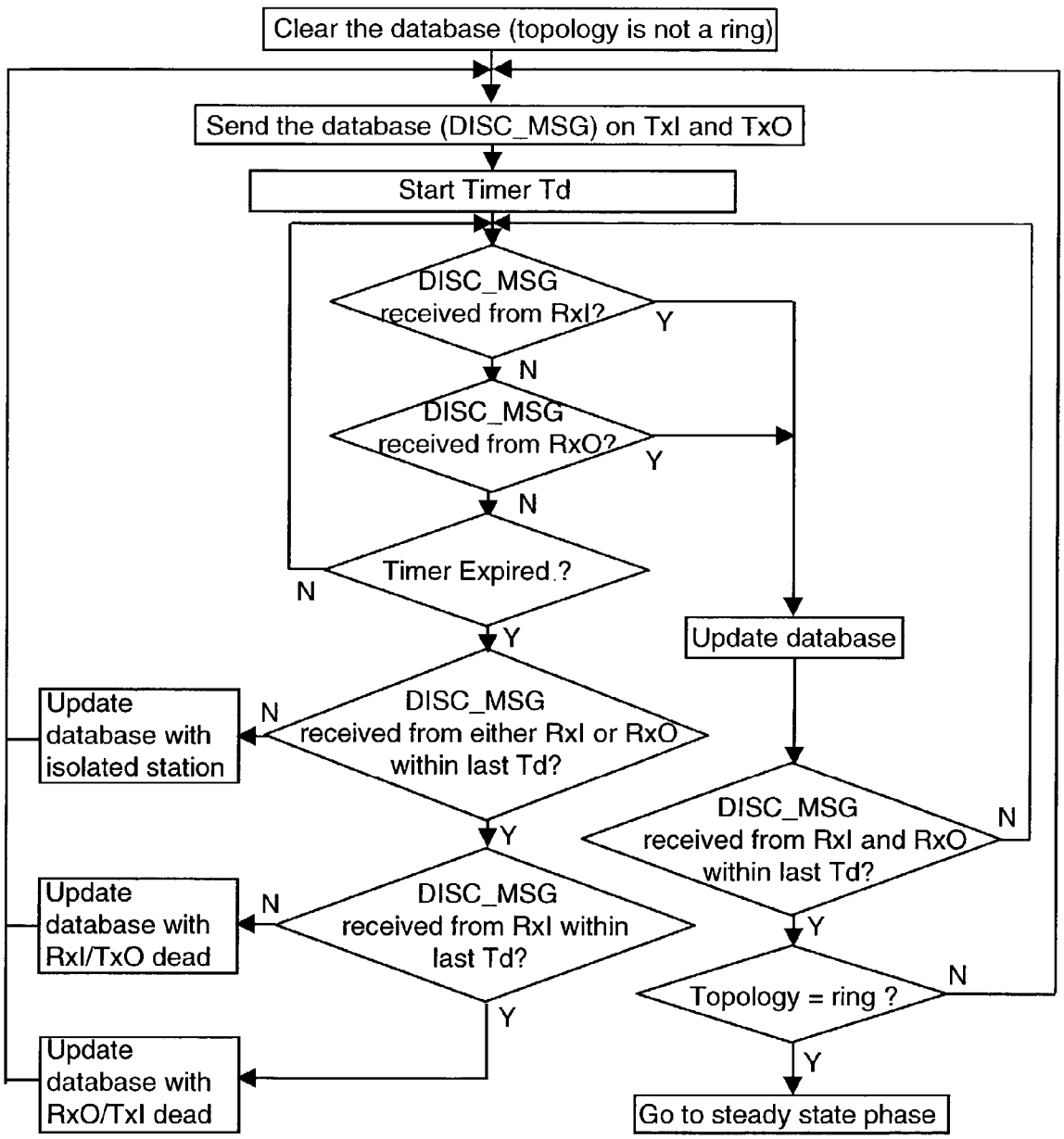
FIG. 4 illustrates a flowchart of the algorithm for the topology discovery phase, according to one embodiment.
Figure 5:
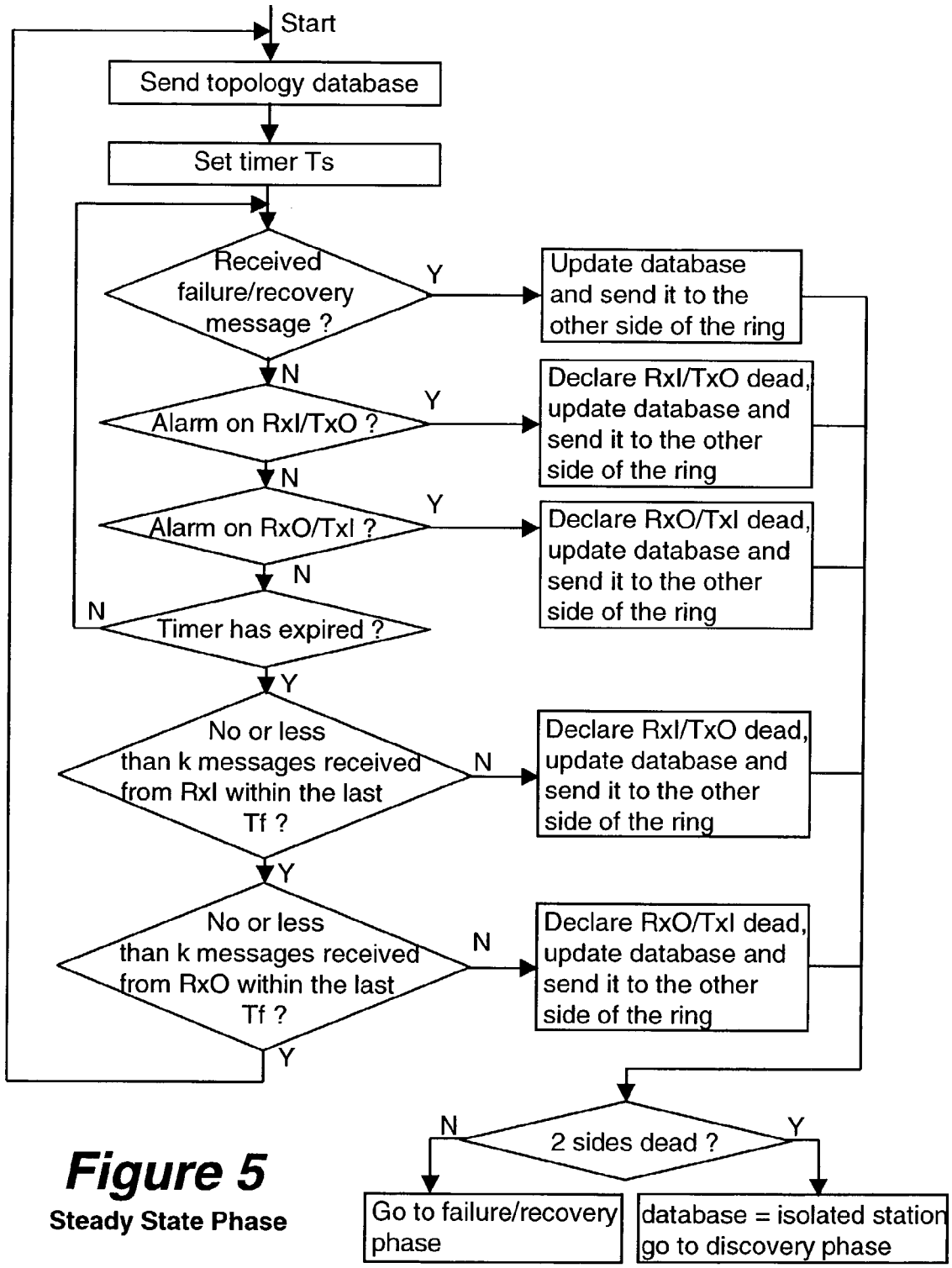
FIG. 5 illustrates a flowchart of the algorithm for the steady state phase, according to one embodiment.

Each phase will be described in detail below. FIGS. 4 and 5 are flowcharts illustrating a particular methodology for working the invention.

1. Topology Discovery Phase for Each Station:

The algorithm for the topology discovery phase in accordance with one embodiment is described below and FIG. 4 is one example flowchart of the algorithm.

Clear the database.

```
While (the topology is not a ring) {
        send the topology database (DISC_MSG) to TxI and TxO
        start timer Td
        switch {
            case (a topology discovery packet, DISC_MSG, has been received
            from both RxI and RxO within a discovery timer Td) {
                add the information to the database
                if the topology is a ring, go to steady state phase (break)
                if there is an error in the topology, signal the control plane
            }
            case (no packet has been received on RxI within last Td) {
                declare RxI/TxO dead in the database
            }
            case (no packet has been received on RxO within last Td) {
                declare RxO/TxI dead in the database
            }
            case (no packet has been received on either RxI or RxO within last
            Td) {
                declare isolated station
            }
        }
    }
```

Note that as soon as the two topology discovery messages have been received (one on RxI, one on RxO), the updated database is sent. There is no need to wait for the topology discovery timer to expire Td. This will speed up the discovery process, at the expense of a bigger bandwidth/processing usage, which is believed to be acceptable since there is no or little traffic during the discovery phase.

Adding the information to the database works as follows:

If the station x receives on RxO a message containing $?A_y$ or $-A_y$, x knows that $A_x\text{-}A_y$, If the station x receives on RxI a message containing $A_y?$ or $A_y\_$, x knows that $A_y\_A_x$, If the station x receives on RxO a message containing $A_x\_A_y$, x knows that $A_x=A_y$, If the station x receives on RxI a message containing $A_y\text{-}A_x$, x knows that $A_y=A_x$.

2. Steady State Phase

The algorithm for the steady state phase in accordance with one embodiment is described below and FIG. 5 is an example flowchart of the algorithm.

```
While (no error) {
        When steady state timer Ts expires, send the topology database to TxI
        and TxO (STDY_MSG)
        When a failure message (FAIL_MSG) or recovery message (RECO_MSG)
        respectively is received on RxI (or RxO), process it (i.e. update the
        database) and transmit the updated database in a failure message or
        recovery message respectively to TxI (or TxO respectively) as soon as
        possible.
        In both cases (whether Ts expires or a failure/recovery message has been
        received):
            If (no message has been received within Tf from RxI, or in an
            alternative being that less than k topology messages have been
            received within Tf from RxI)
                {declare RxI/TxO dead}
            If (no message has been received within Tf from RxO, or in an
            alternative being that less than k topology messages have been
            received within Tf from RxO)
                {declare RxO/TxI dead}
```

```
        If (an error (or alarm) is detected on RxI)
            {declare RxI/TxO dead}
        If (an error (or alarm) is detected on RxO)
            {declare RxO/TxI dead}
    switch {
        case (RxI/TxO dead) {
            send topology change (FAIL_MSG) on TxI (XA_x=A_{x+1}...)
            go to failure/recovery phase (break)
        }
        case (RxO/TxI dead) {
            send topology change (FAIL_MSG) on TxO (...=A_{x-1}=A_xX)
            go to failure/recovery phase (break)
        }
        case (both RxI/TxO and RxO/TxI dead) {
            declare isolated station
            go to discovery phase (an alternative is to go to the discovery phase
              with timer Tc instead of Td) (break)
        }
        case (no error) {
            restart timer Ts
        }
    }
}
```

Note that there are two ways of detecting a ring failure:

The first one is to rely on an alarm generated by lower layers (optical/physical). This is usually fast, but does not test the liveliness of the control part of the neighbor.

The second one is to declare a failure when some amount of messages has been lost between a station and its neighbor for a certain period, e.g., failure timer Tf. This is usually slower. To do this, Tf should be at least 2*Ts, so that if one discovery message out of 2 is lost, it still works and this adds tolerance to message loss. Another way is to declare a fault if less than k messages have been received within Tf, with k<Tf/Ts.

3. Failure/Recovery Phase

The algorithm for the failure/recovery phase in accordance with one embodiment is described below. No flowcharts of this phase will be shown since it is a simple combination of the discovery phase running on one side (the "dead" side) and steady state phase running on the other side (the "live" side).

```
When (a link is declared dead) {
    send a (DISC_MSG) on the dead link every Tc (dead link timer) to check if
    a neighbor is present, until a response is received from the dead link
}
When (a response has been received) {
    the station continues the discovery procedure on the side of the failure
    until the connection is found to be up on both directions,
    on the side of the link that is still alive, continue as in steady state phase to
    send STDY_MSG every timer Ts
}
When (the link is declared alive again i.e., at the end of the one-sided
discovery procedure) {
    send a (RECO_MSG) and go back to steady state phase
}
```

Following is an Example of Discovery/steady State/failure/recovery Process

The discovery algorithm described thus far works as follows at power up:
All the stations start with an empty database.
View of the topology table: ?A_x?.
The stations send ?A_x? (DISC_MSG).
Then a station x receives from RxI ?A_{x-1}? and from RxO ?A_{x+1}?.

It deduces ?A_{x-1}_A_x-A_{x+1}? and sends this to TxO and TxI.
Then it receives from RxI ?A_{x-2}_A_{x-1}-A_x? and from RxO ?A_x_A_{x+1}-A_{x+2}?.

It deduces ?A_{x-2}_A_{x-1}=A_x=A_{x+1}-A_{x+2}? and sends this to TxO and TxI.

Next it receives from RxI ?A_{x-3}_A_{x-2}=A_{x-1}=A_x-A_{x+1}? and from RxO ?A_{x-1}_A_x=A_{x+1}=A_{x+2}-A_{x+3}? And sends this to TxO and TxI.

It continues until it detects the same station twice in the ring.

Figure 1:
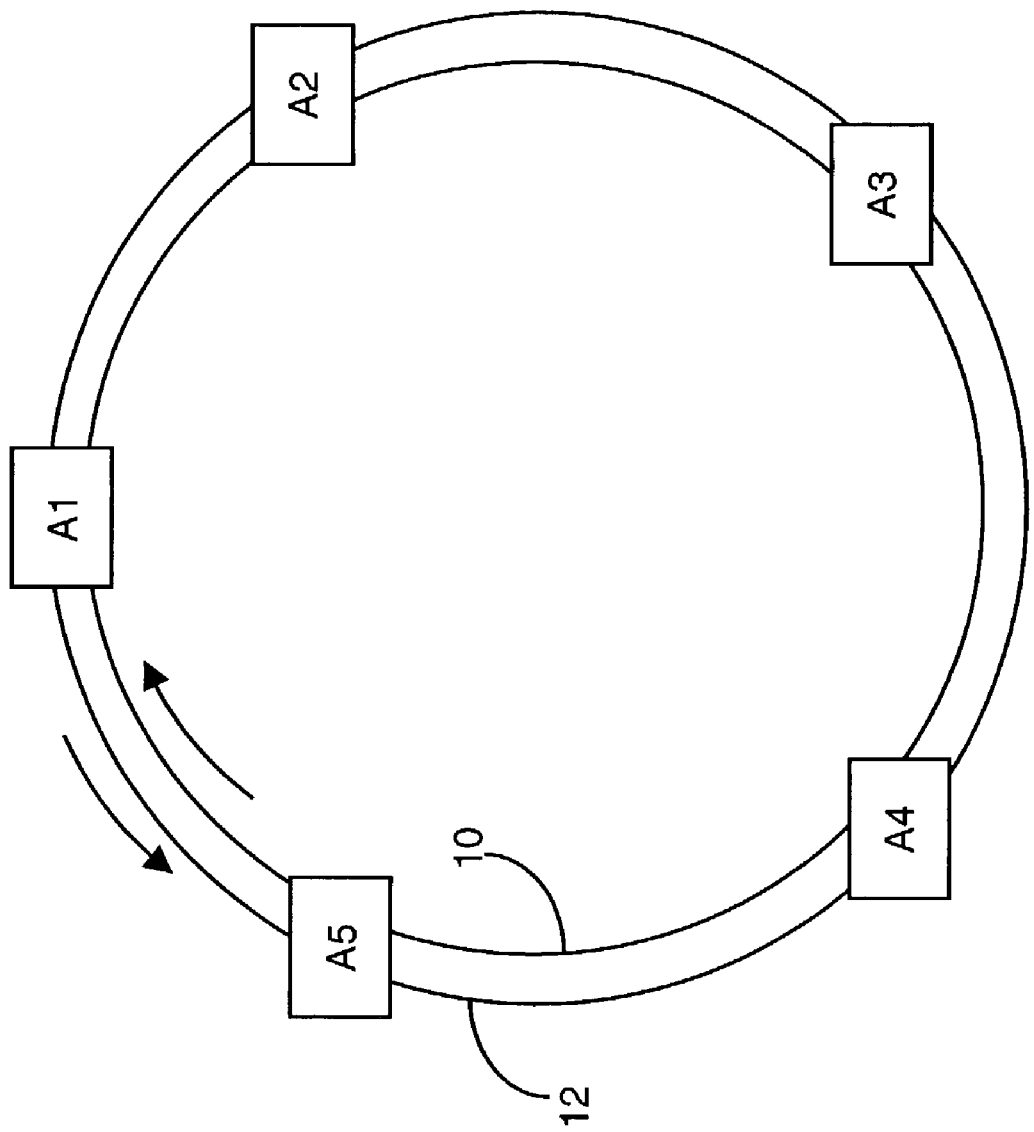
FIG. 1 shows five stations, A1 to A5, being connected in a dual ring which comprises CW (clockwise) ring and CCW (counter clockwise) ring.
Figure 2:
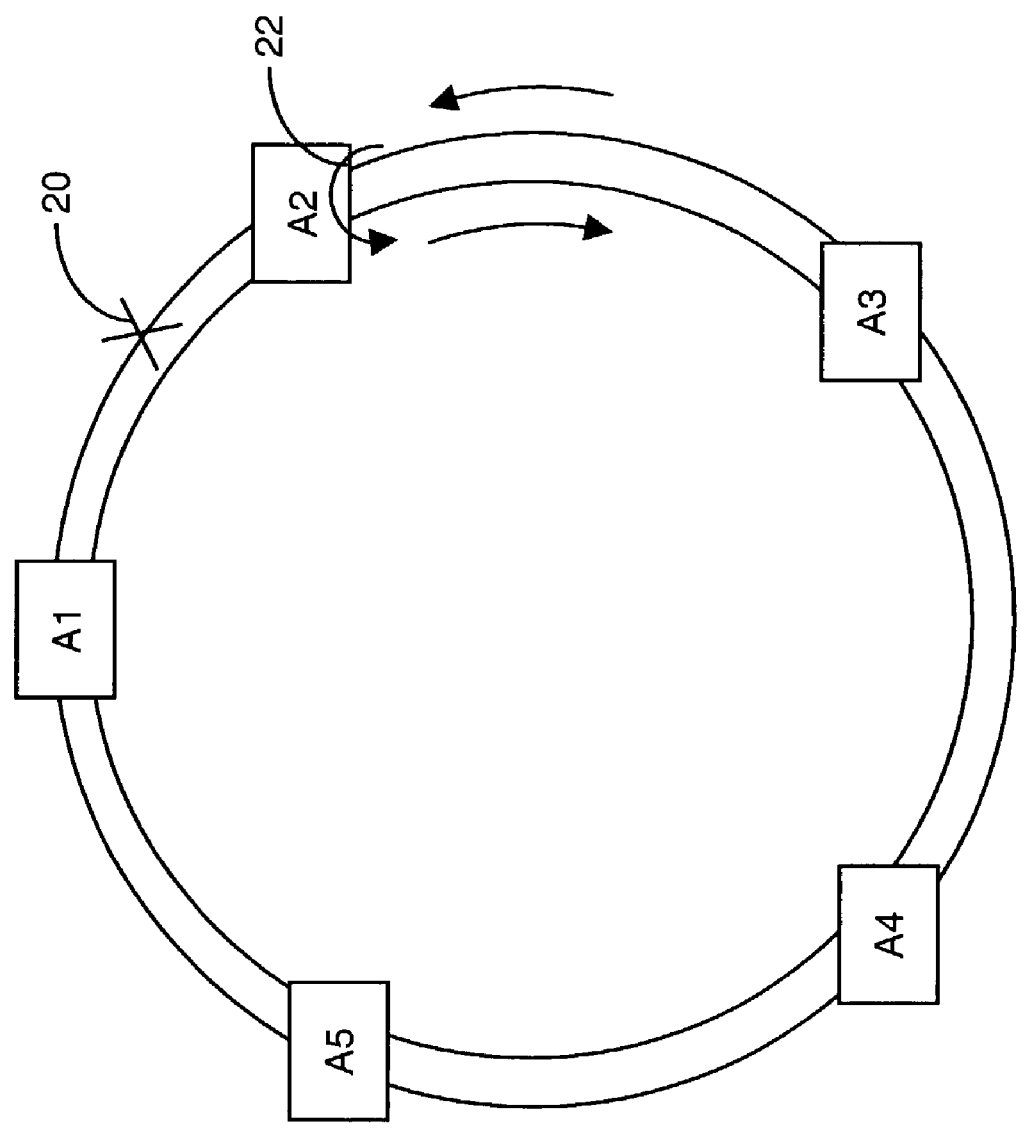
FIG. 2 shows an example of wrapping in a case of link failure.

A more specific example is given below by referring to FIG. 1 in which there are five stations in the ring. Viewed from the station A1, the process proceeds as follows:

Discovery Phase
A1 sends ?A1? (DISC_MSG).
A1 receives ?A5? from RxI and ?A2? from RxO.
A1 sends ?A5_A1-A2? (DISC_MSG).
A1 receives ?A4_A5-A1? from RxI and ?A1_A2-A3? from RxO.
A1 sends ?A4_A5=A1=A2-A3? (DISC_MSG).
A1 receives ?A3_A4=A5=A1-A2? from RxI and ?A5_A1=A2=A3-A4? from RxO.
At this point, A1 has the full view of the ring, its database contains A3=A4=A5=A1=A2=A3, and so do all the other stations (because they all run the same method)

It should be noted that any new station or a station attempting to recover the topology performs this phase.

Steady State Phase

A1 sends A4=A5=A1=A2=A3=A4 (STDY_MSG) every timer Ts.

A2 . . .

. . .

A5 sends A3=A4=A5=A2=A2=A3 (STDY_MSG) every timer Ts.

Failure or adding a new station

Figure 6:
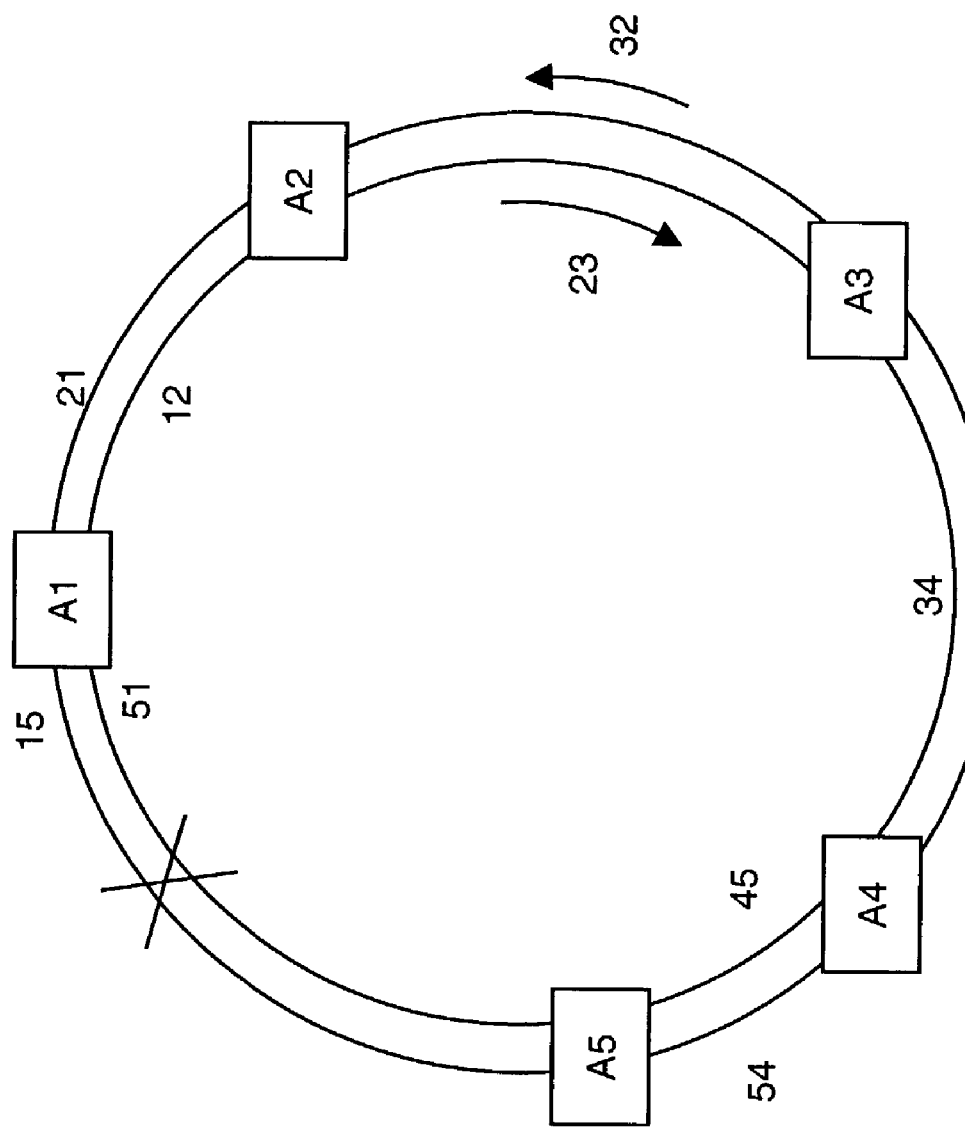
FIG. 6 shows when the links between A1 and A5 are cut, due to a failure or in order to add another station.

To add another station, the links between A1 and A5 are cut (FIG. 6):

Either when an alarm is raised, or after having received less than k messages within timer Tf (failure timer), A1 and A5 declare the link dead.

A1 sends a failure message XA1=A2=A3=A4=A5X (FAIL_MSG).

A5 sends a failure message XA1=A2=A3=A4=A5X (FAIL_MSG).

Then A1 and A5 go in failure/recovery phase.

Upon reception of a failure message, A2 and A4 transmit the failure message, and after 3 hops all the stations are aware that the links between A1 and A5 are broken.

Failure/Recovery Phase

A1 sends a (DISC_MSG) on TxO (?A1=A2=A3=A4=A5X) every Tc timer.

A5 sends a (DISC_MSG) on TxI (XA1=A2=A3=A4=A5?) every Tc timer.

They both send (STDY_MSG) XA1=A2=A3=A4=A5X on the other link every Ts timer.

Figure 7:
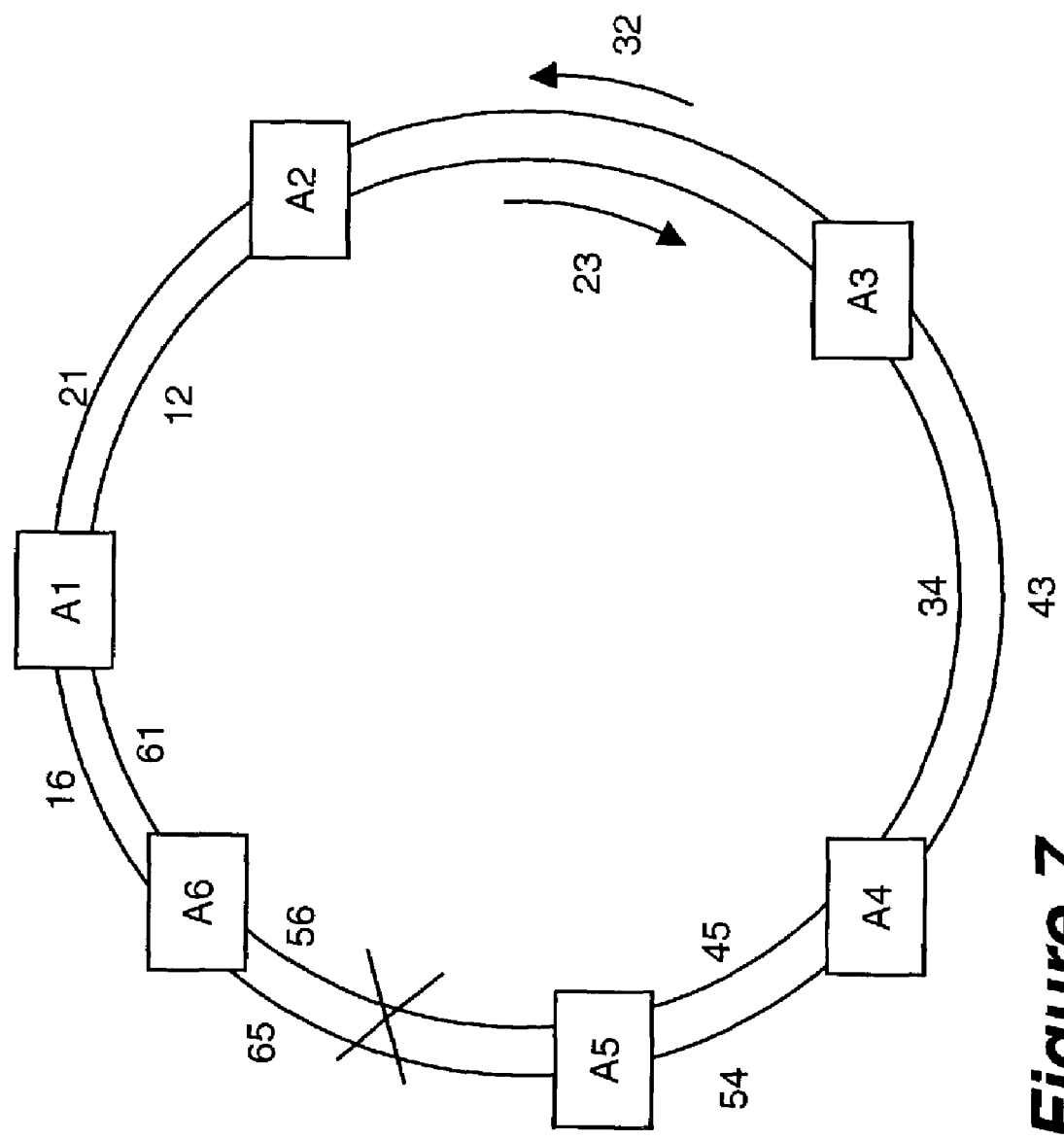
FIG. 7 shows when another station A6 is connected to A1 but not on the side of A5.

Then another station A6 is connected to A1 but not on the side of A5 (FIG. 7):

A6 sends ?A6? (DISC_MSG).

A1 sends ?A1=A2=A3=A4=A5X (DISC_MSG).

A6 receives ?A1=A2=A3=A4=A5X from RxO.

A1 receives ?A6? from RxI.

A6 sends ?A6-A1=A2=A3=A4=A5X (DISC_MSG).

A1 sends ?A6_A1=A2=A3=A4=A5X (DISC_MSG).

After having received the messages,

A6 and A1 know that ?A6=A1=A2=A3=A4=A5X.

Eventually, after Td, A6 will declare the links on its A5 side dead, and send XA6=A1=A2=A3=A4=A5=X (FAIL_MSG), and this will propagate through A1, A2, A3 . . .

A6 will be in failure/recovery phase, and A1 will go back to steady state phase.

Figure 8:
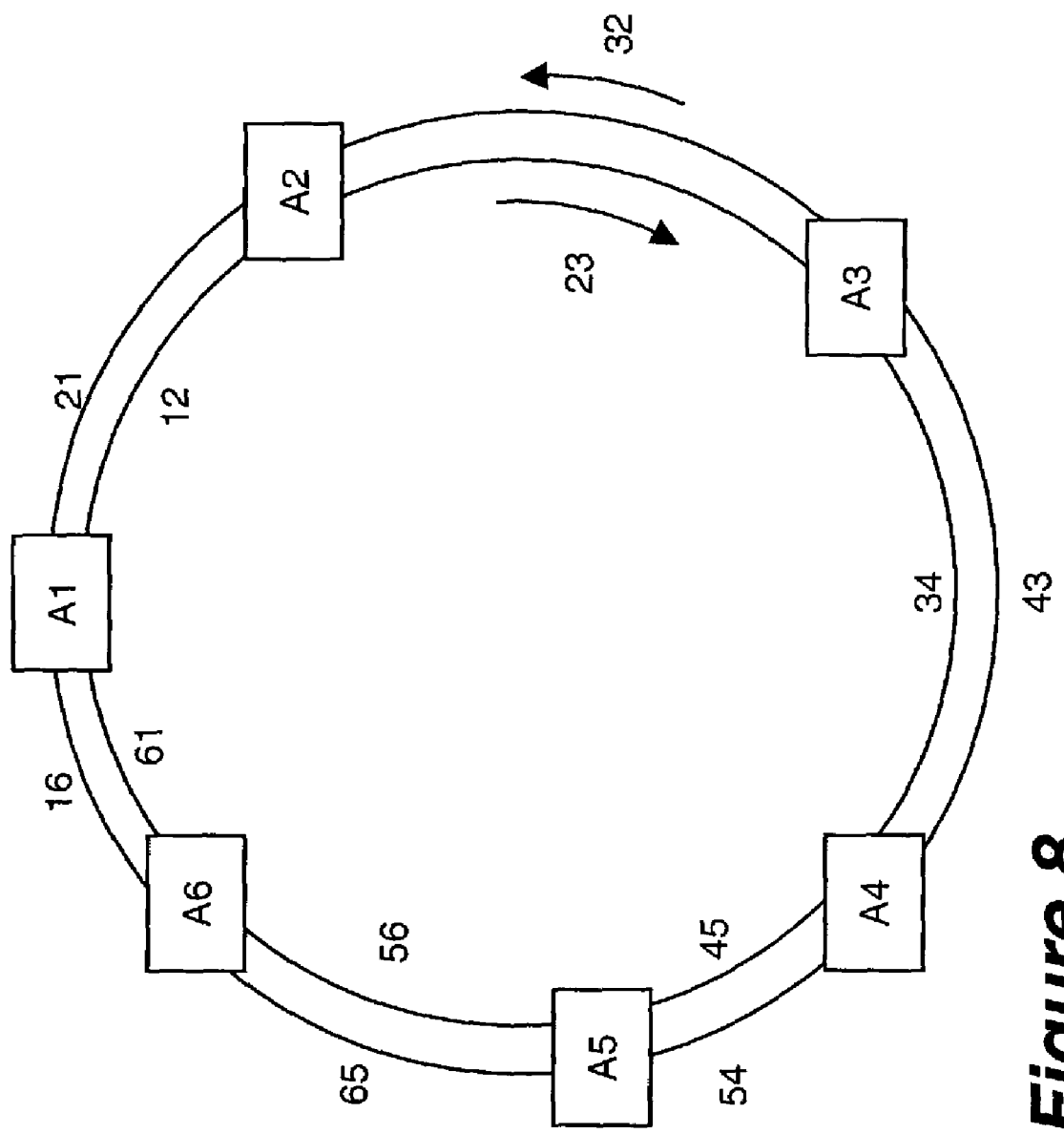
FIG. 8 shows that station A6 is also connected on the side of A5.

Lastly, station A6 will be connected to A5 (FIG. 8), and they will follow the same procedure to converge to a ring topology and go back to steady state phase.

The present invention achieves the convergence time (per station) twice shorter than the known methods. It requires only neighbor-to-neighbor communication, resulting in easier failure location detection. Because it needs no broadcast storm, fewer messages need to be processed, resulting in simpler datapath (all the topology messages are terminated/originated and never forwarded). These advantages are realized by taking advantage of the two directions (counter-direction) of the ring.

The per packet processing on the control path is more important in the present invention than for prior art solutions to this problem. It is because it involves updating the topology database for every packet received and these packets can become a non-negligible amount during the discovery phase. This is, however, not believed to be an issue, because there is no or little traffic passing during the discovery phase, and also because there are fewer messages to process.

What is claimed is:

1. In a network having a ring oriented topology with a plurality of stations linked through a pair of counter rotating ringlets, a respective said station having a first neighboring station in a first direction and a second neighboring station in a second direction, a method of communicating network topology information among the stations, comprising the steps of:

(a) said respective station exchanging, through the ringlets, a first discovery message with said first neighboring station in said first direction and a second discovery message with said second neighboring station in said second direction, the discovery messages being exchanged only with said first and second neighboring stations without forwarding the discovery messages to stations beyond said first and second neighboring stations, the discovery messages including topology databases stored in the first and second neighboring stations, said topology databases providing address and connectivity information pertaining to the stations in said network;

(b) updating a topology database provided at said respective station with the address and connectivity information received from said first and second neighboring stations; and (c) repeating the above steps to complete a current topology image of the network at said respective station and at each station connected in said network, wherein said discovery messages are sent at a predetermined timer setting Td, and wherein said address information for said respective station includes a unique address in said network which is a combination of respective addresses of said respective station on both counter rotating ringlets, and wherein the topology image is completed once a node placed at about ½ of the ring length from said respective station receives messages containing topology information on said respective station in both said first and second directions.

2. The method according to claim 1, further comprising the steps of:

after the topology image has been completed, periodically exchanging, through the ringlets, at a predetermined timer setting Ts, steady state messages with respective neighboring stations, the steady state messages containing topology databases presently stored in the stations, and if the topology of said network changes, updating existing topology databases, and exchanging at said Ts, through the ringlets, new steady state messages with respective neighboring stations, the new steady state messages containing updated topology databases.

3. The method according to claim 1 further comprising identifying a failure in said network when said discovery message has not been received from one of said neighboring stations during a predetermined timer setting Td.

4. The method of claim 1, wherein said topology database comprises a list of addresses of said stations arranged sequentially in said first direction and separated by a link state identifier.

5. The method of claim 1, wherein step (a) comprises, at a station connected on said RPR network:

receiving at a first interface (RxI, TxO) a first discovery message from an upstream neighboring station on said first ringlet, said first discovery message including the address of said upstream neighboring station; and transmitting from a second interface (RxO, TxI) an updated first discovery message to a downstream neighboring station on said first ringlet, said updated first discovery message including the address of said upstream neighboring station, the state of the inner link between said upstream neighboring station and said station and the address of said station.

6. The method of claim 1, wherein step (a) comprises, at a station connected on said network:

receiving at a second interface (RxO, TxI) a second discovery message from an upstream neighboring station on said second. ringlet, said second discovery message including the address of said upstream neighboring station; and transmitting from a first interface (RxO, TxI) an updated second discovery message to a downstream neighboring station on said second ringlet, said updated second discovery message including the address of said upstream neighboring station, the state of the second link between said upstream neighboring station and said station and the address of said station.

7. The method of claim 1, wherein a link state identifier in said topology database defines one of the following link states: connection to the first ringlet present, connection to the second ringlet present, bidirectional connection present, failure in one of the ringlets, and the state of the link is unknown.

8. The method according to claim 2, further comprising the steps of:

identifying a failure in said network when k steady state messages have not been received from one of said neighboring stations during a predetermined timer setting Tf; and sending a failure message to the other said neighboring station, said failure message indicating a failed interface with said neighboring station at said station, k being a preset integer=0.

9. The method according to claim 2, further comprising the steps of:

identifying a failure on both interfaces of said station to said respective neighboring stations when k steady state messages have not been received from both respective neighboring station during Tf;

declaring an isolated station fault; and at each station on the ring, performing steps of (a) to (c), by sending said discovery messages at a predetermined timer setting Tc rather than Td, to complete the topology image of the network, and for storing the topology image of the network at each station on said network.

10. The method according to claim 2, further comprising the steps of:

declaring a link in a ringlet between two neighboring stations dead if the steady state message is not received within a predetermined timer setting Tf, and completing updating the topology image of the network accordingly.

11. The method of claim 5, wherein said first discovery message includes a list of addresses of stations on said first ringlet upstream from said station, the addresses being arranged sequentially and separated by a respective link state identifier, and wherein the updated first discovery message appends to said first discovery message the address of said upstream neighboring station, the state of the first link between said upstream neighboring station and said station and the address of said station.

12. The method of claim 6 wherein said second discovery message includes a list of addresses of stations on said second ring upstream from said station, arranged sequentially and separated by a respective link state identifier, and wherein the updated second discovery message appends to said second discovery message the address of said upstream neighboring station, the state of the inner link between said upstream neighboring station and said station and the address of said station.

13. The method according to claim 8, further comprising the steps of:

sending a discovery message repetitively, at time setting Tc to the neighboring station on the failure, the discovery message containing the topology database presently stored in the station, and sending a steady state message at each said Ts to the other neighboring station, the steady state message containing topology database presently stored in the station, if a proper response to the discovery message is received from the neighboring station.

14. The method according to claim 13, further comprising the steps of:

sending a discovery message repetitively, at each said Tc to the neighboring station on the failure, the discovery message containing the topology database presently stored in the station, until receipt of a response to said discovery message; and repeating step (a) and (b) for all stations downstream from the failure, until said complete topology image of said network is obtained at each station.

15. The method according to claim 13, further comprising the steps of:

declaring a link in a ringlet to said neighboring station dead if the discovery message is not received within a Td, and updating the topology image of the network accordingly.

16. In a telecommunications network with a ring-oriented configuration, a method of communicating network topology information among a plurality of stations on a pair of counter rotating ringlets, a respective said station having a first neighboring station in a first direction and a second neighboring station in a second direction, comprising the steps of:

(a) sending from said respective station connected on said network, discovery messages on both ringlets to said first neighboring station in said first direction and second neighboring stations in said second direction, the discovery messages including an existing topology database stored in said respective station, said topology databases providing address and connectivity information pertaining to the stations in said network; and (b) receiving at said respective station discovery messages on both ringlets from said first and second neighboring stations without forwarding the discovery messages to stations beyond said first and second neighboring stations, the discovery messages containing topology databases stored in said first and second neighboring stations;

(c) repeating the above steps to complete a current topology image of the network at said respective station and at each station connected in said network, wherein said discovery messages are sent at a predetermined timer setting Td, and wherein said address information for a station includes a unique address in said network which is a combination of the addresses of said station on both counter rotating ringlets, and wherein the topology image is completed once a node placed at about ½ of the ring length from said respective station receives messages containing topology information on said respective station in both said first and second directions.

17. The method according to claim 16, further comprising the steps of:
each station on the network,
determining the status of links to said respective neighboring stations by analyzing the topology databases received from the neighboring stations;
updating the existing topology database as a result of the determined status of links and storing therein an updated version of the topology image of the network, and
sending discovery messages to the neighboring stations on the both ringlets, the discovery messages containing the updated topology database.

18. The method according to claim 16, further comprising the steps of:
declaring a link in a ringlet between two neighboring stations dead if the discovery message is not received within a predetermined timer setting Td, and
updating the topology image of the network accordingly.

19. The method according to claim 18, further comprising the steps of:
completing the topology image of said network when said current topology database received from both neighboring stations at said station already contains the address of said station,
periodically sending steady state messages on the both ringlets to the neighboring stations, at a predetermined timer setting Ts the steady state messages containing the current topology database presently stored in the station; and
if the topology of said network changes:
updating the presently stored topology database by repeating steps (a) and (b) until an updated topology image of said network is completed and storing an updated topology database at all stations of said network; and
sending at said Ts new steady state messages to the neighboring stations, the new steady state messages containing the updated topology database.

20. The method according to claim 19, further comprising the steps of:
identifying a failure in said network when k steady state messages have not been received from a neighboring station during a predetermined timer setting Tf; and
sending a failure message to the other neighboring station, said failure message indicating a failed interface at said station, k being a preset integer=0.

21. In a dual ring network comprising a plurality of stations, each station connected to first and second adjacent stations by a respective pair of receive and transmit links, thereby forming first and second counter-rotating ringlets, a method of determining the topology of the network, comprising the steps of:
(a) sending, by each operative station in the network, a first discovery message only to said first adjacent station and a second discovery message only to said second adjacent station, said discovery messages being exchanged only with said adjacent stations without forwarding the discovery messages to stations beyond said first and second adjacent stations, wherein the discovery message includes an address of the station and a status indication of the links connected to the adjacent stations;
(b) receiving, at each station, the first and second discovery messages of its two adjacent stations;
(c) updating, at each station from the received first and second discovery messages, the status of links connected to the adjacent stations;
(d) sending, by each operative station, a new discovery message that includes the updated status of the links to the adjacent stations, the addresses of the adjacent stations, and any other link status or address information in the received discovery messages; and
(e) repeating steps (b) to (d), until an address of a station appears twice in a discovery message, the discovery message thereby comprising the addresses and link status of all the operative stations in the network, and wherein a topology image is completed once a node placed at about ½ of the ring length from said respective station receives messages in said first and second directions containing topology information on said respective station.

22. In a network with a ring-oriented topology which comprises a plurality of stations linked by a first ringlet transporting traffic in one direction and a second ringlet transporting traffic in the opposite direction, a respective station comprising:
a first interface (RxI, TxO) for transmitting traffic over the second ringlet and receiving traffic from the first ringlet;
a second interface (RxO, TxI) for transmitting traffic over the first ringlet and receiving traffic from the second ringlet;
a local interface for adding and dropping traffic to and from the first and second ringlets;
a database memory for storing a topology image of the network, and
a controller for regulating the transmission and reception of a variety of control messages onto and from the inner and outer ringlets,
wherein said respective station is uniquely identified on said network using a combination of the addresses of said first and second interfaces, said respective station exchanging a first message only with a first neighboring station in a first direction and a second message only with a second neighboring station in a second direction, said first and second messages being exchanged without forwarding the discovery messages to stations beyond said first and second neighboring stations, and wherein a topology image of the network includes address and connectivity information for all stations connected in said network, and wherein said topology image is completed once a node placed at about ½ of the ring length from said respective station receives messages in both said first and second directions containing topology information on said respective station.

23. The station according to claim 22, wherein said control messages include a discovery message, a steady state message, a failure message and a recovery message, each of these messages comprising a topology database representing link status and addresses of stations on the network.

24. The station according to claim 23 further comprising a plurality of timer settings associated with said control messages.

* * * * *

UNITED STATES PATENT AND TRADEMARK OFFICE
CERTIFICATE OF CORRECTION

PATENT NO. : 7,599,315 B2  
APPLICATION NO. : 10/319675  
DATED : October 6, 2009  
INVENTOR(S) : Cornet et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1433 days.

Signed and Sealed this

Twenty-eighth Day of September, 2010

David J. Kappos  
*Director of the United States Patent and Trademark Office*